United States Patent

Kubo et al.

[11] Patent Number: 5,883,175
[45] Date of Patent: Mar. 16, 1999

[54] STAINPROOFING COMPOSITION HAVING WATER-AND-OIL-REPELLENCY

[75] Inventors: Motonobu Kubo; Masamichi Morita; Hiroko Ogisu; Takashi Enomoto; Akihiko Ueda, all of Osaka, Japan

[73] Assignee: Daikin Industries Ltd., Osaka, Japan

[21] Appl. No.: 812,133

[22] Filed: Mar. 5, 1997

Related U.S. Application Data

[63] Continuation of PCT/JP95/01648 Aug. 21, 1995.

[30] Foreign Application Priority Data

Sep. 5, 1994 [JP] Japan ................................. 6-211105

[51] Int. Cl.$^6$ ........................................................ C08F 2/16
[52] U.S. Cl. ........................... 524/458; 524/457; 524/460; 524/502; 524/533; 524/535; 524/538; 524/539; 524/544; 524/805; 526/243; 526/245; 526/246
[58] Field of Search ................................. 524/457, 458, 524/533, 535, 538, 539, 544, 460, 805, 502; 526/243, 245, 246

[56] References Cited

U.S. PATENT DOCUMENTS

| | | | |
|---|---|---|---|
| 2,803,615 | 8/1957 | Ahlbrecht et al. | 524/805 |
| 3,068,187 | 12/1962 | Bolstad et al. | 524/533 |
| 3,256,231 | 6/1966 | Johnson, Jr. et al. | 524/805 |
| 3,384,627 | 5/1968 | Anello et al. | 524/544 |
| 3,532,659 | 10/1970 | Hager et al. | 524/805 |
| 3,671,574 | 6/1972 | Knell et al. | 526/245 |
| 3,686,281 | 8/1972 | Knell et al. | 260/485 F |
| 3,838,083 | 9/1974 | Ukihashi et al. | 524/805 |
| 5,057,577 | 10/1991 | Matsuo et al. | 525/276 |

FOREIGN PATENT DOCUMENTS

| | | |
|---|---|---|
| 776914A1 | 6/1997 | European Pat. Off. . |
| 59-219380 | 12/1984 | Japan ................................. 524/805 |
| 61-1264081 | 11/1986 | Japan ................................. 524/805 |
| 2-1795 | 1/1990 | Japan . |

*Primary Examiner*—Judy M. Reddick
*Attorney, Agent, or Firm*—Birch, Stewart, Kolasch & Birch, LLP

[57] ABSTRACT

A stainproofing composition having water- and oil-repellency, containing a polymer emulsion prepared by dissolving at least one polyfluoroalkyl group-containing compound selected from the group consisting of a polyfluoroalkyl group-containing (meth)acrylate polymer, a polyfluoroalkyl group-containing polyester, a polyfluoroalkyl group-containing maleate and a polyfluoroalkyl group-containing fumarate in at least one monomer selected from the group consisting of a (meth)acrylate ester, a vinyl ester, a styrene compound and vinylidene chloride, vinyl chloride, emulsifying the resultant solution in water to prepare an oil-in-water emulsion, and polymerizing the emulsion exhibits excellent water- and oil-repellency and stainproof properties. It is also superior in sedimentation stability of the emulsion.

6 Claims, 1 Drawing Sheet

STAINPROOFING COMPOSITION HAVING WATER-AND-OIL-REPELLENCY

This application is a continuation-in-part of PCT International Application No. PCT/JP95/01648 which has an international filing date of Aug. 21, 1995 which designated the United States, the entire contents of which are hereby incorporated by reference.

FIELD OF THE INVENTION

The present invention relates to a stainproofing composition for fiber, comprising a polymer emulsion having a microphase separation structure in particles (hereinafter referred to as a "composite emulsion") prepared by emulsifying, in water, a solution wherein a specific polyfluoroalkyl group-containing compound (hereinafter abbreviated to a "Rf compound") is dissolved in a specific monomer to give an oil-in-water emulsion, and polymerizing the emulsion. The stainproofing composition of the present invention acts also as a water- and oil-repellent.

RELATED ART

As a fluorine-containing water- and oil-repellent composition or fluorine-containing stainproofing composition having a microphase separation structure in particles, an emulsion prepared by a seed emulsion polymerization (Japanese Patent Kokai Publication No. 1795/1990) has hitherto been known. This emulsion is obtained by swelling the previously prepared seed particles of a polyfluoroalkyl group-containing polymer with a mixture of a hydrocarbon monomer and a polyfluoroalkyl group-containing monomer (hereinafter referred to as a "fluorine monomer"), followed by polymerizing. This emulsion has the feature that the equivalent water- and oil-repellency can be obtained by a low-temperature heat treatment at a low fluorine concentration in comparison with a random copolymer having the same composition as that of the above emulsion and prepared by copolymerizing a hydrocarbon monomer and a fluorine monomer according to a usual radical polymerization method. However, there was the problem that a long time is required to swell the seed particles with the monomer and it is difficult to conduct industrially the mass production.

SUMMARY OF THE INVENTION

The present inventors have intensively studied on a method of producing a fluorine-containing stainproofing composition having a microphase separation structure in particles. As a result, the present inventors have found a method of preparing a composite emulsion having a microphase separation structure in particles, which comprises emulsifying a solution, wherein a specific Rf compound is dissolved in a specific monomer, in water to prepare an oil-in-water emulsion and polymerizing the emulsion. The composite emulsion thus obtained exhibits the equivalent water- and oil-repellency and stainproof properties by a lower temperature heat treatment at a lower fluorine concentration in comparison with the corresponding blend emulsion (prepared by blending an emulsion of a Rf compound with a blender emulsion obtained by previously emulsion-polymerizing a monomer), a copolymer emulsion (prepared by copolymerizing a Rf compound with a monomer when the Rf compound has a polymerizable double bond) and a polymer emulsion prepared by the seed emulsion polymerization. The composite emulsion of the present invention has the feature that the composite emulsion is superior in sedimentation stability to the corresponding blend emulsion because the specific gravity of the composite emulsion particles is close to that of water.

The present invention provides a stainproofing composition having water- and oil-repellency, comprising a polymer emulsion prepared by dissolving at least one polyfluoroalkyl group-containing compound selected from the group consisting of a polyfluoroalkyl group-containing (meth)acrylate polymer, a polyfluoroalkyl group-containing polyester, a polyfluoroalkyl group-containing maleate and a polyfluoroalkyl group-containing fumarate in at least one monomer selected from the group consisting of a (meth)acrylate ester, a vinyl ester, a styrene compound, vinyl chloride and vinylidene chloride, emulsifying the resultant solution in water to give an oil-in-water emulsion, and polymerizing the resultant emulsion.

DETAILED DESCRIPTION OF THE INVENTION

Figure 1:
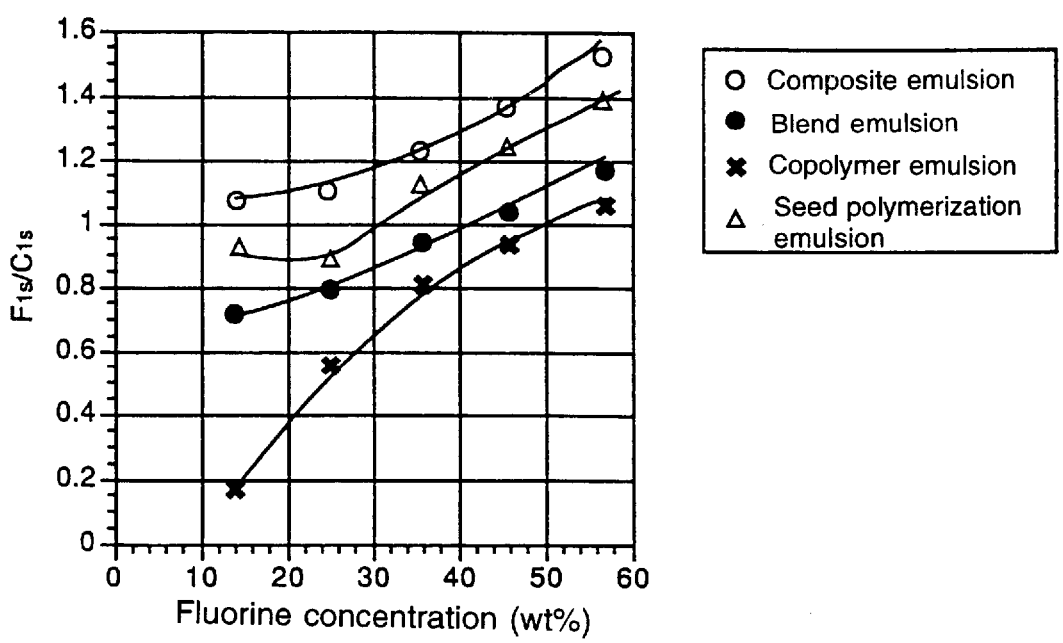
FIG. 1 is a graph illustrating a relationship between F/C and a fluorine concentration in a polymer, in the emulsions used in Example 1 and Comparative Examples 1 to 3.

The polyfluoroalkyl group-containing compound (Rf compound) is, for example, a polymer of a polyfluoroalkyl group-containing (meth)acrylate having a repeating unit represented by the general formula (1):

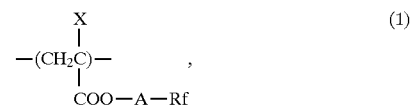

a polyfluoroalkyl group-containing polyester represented by the general formula (2):

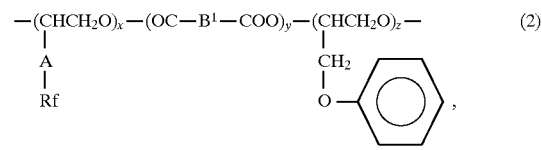

a polyfluoroalkyl group-containing maleate represented by the general formula (3):

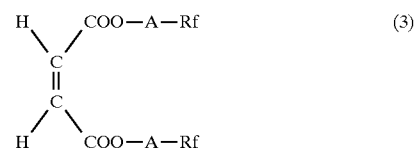

or a polyfluoroalkyl group-containing fumarate represented by the general formula (4):

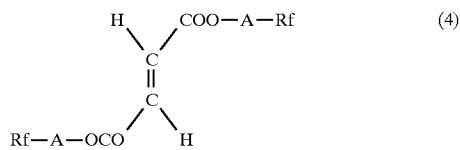

wherein Rf is a polyfluoroalkyl group having 6 to 16 carbon atoms; A is an alkylene group having 1 to 4 carbon atoms, or

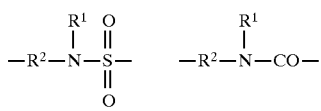

(wherein $R^1$ is an alkyl group having 1 to 4 carbon atoms and $R^2$ is an alkylene group having 1 to 4 carbon atoms) or $$-CH_2\underset{\underset{OH}{|}}{C}HCH_2-;$$

$B^1$ is an alkylene group having 1 to 4 carbon atoms or a phenylene group;

X is a hydrogen atom or a methyl group;

x is from 1 to 1000; y is from 1 to 100; and z is from 1 to 1000.

Specific examples of the Rf compound used in the present invention include the following compounds.

The polyfluoroalkyl group-containing (meth)acrylate polymer is a homopolymer or a copolymer. Examples of the repeating unit in the polyfluoroalkyl group-containing (meth)acrylate polymer include the followings:

—[$CH_2$—$CHCOOC_2H_4C_nF_{2n+1}$]—
—[$CH_2$—$C(CH_3)COOC_2H_4C_nF_{2n+1}$]—
—[$CH_2$—$CHCOOC_2H_4N(CH_3)SO_2C_nF_{2n+1}$]—
—[$CH_2$—$CHCOOC_2H_4C_nF_{2n-1}(CF_3)_2$]— wherein n is an integer of 6–16.

The polyfluoroalkyl group-containing (meth)acrylate copolymer is a copolymer of two or more polyfluoroalkyl group-containing (meth)acrylates, or a copolymer of at least one polyfluoroalkyl group-containing (meth)acrylate and at least one other monomer. Examples of the repeating unit derived from the other monomer in the copolymer of the polyfluoroalkyl group-containing (meth)acrylate include the followings:

—[$CH_2$—$CHCOOC_mH_{2m+1}$]—
—[$CH_2$—$CHOCOC_2H_{2p+1}$]—
—[$CH_2$—$CH(C_6H_5)$]—
—[$CH_2$—$CHCl$]—
—[$CH_2$—$CCl_2$]— wherein m is an integer of 1 to 45 and p is an integer of 1 to 45. Example of the copolymer of the polyfluoroalkyl group-containing (meth)acrylate include the following compounds:

a copolymer having a repeating unit: —[$CH_2$—$CHCOOC_2H_4C_nF_{2n+1}$]— and a repeating unit: —[$CH_2$—$CHCOOC_mH_{2m+1}$]—, and a copolymer having a repeating unit —[$CH_2$—$CHCOOC_2H_4C_nF_{2n+1}$]— and a repeating unit: —[$CH_2$—$CHCl$]— wherein m is an integer of 1 to 45 and n is an integer of 6 to 16.

Examples of the polyfluoroalkyl group-containing polyester include the following compounds:

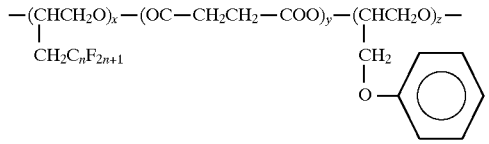
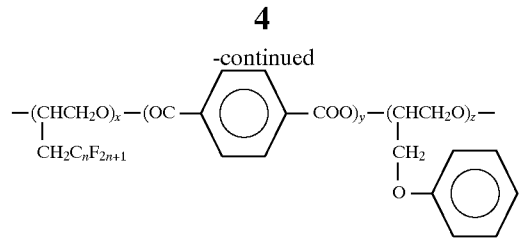

wherein n is an integer of 6 to 16, x is from 1 to 1000, y is from 1 to 100 and z is from 1 to 1000.

Examples of the polyfluoroalkyl group-containing maleate include the following compound:

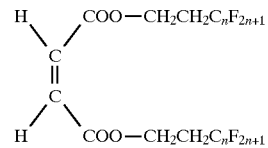

wherein n is an integer of 6 to 16.

Examples of the polyfluoroalkyl group-containing fumarate include the following compound:

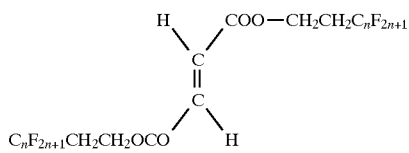

wherein n is an integer of 6 to 16.

Two or more types of Rf compounds may be used in combination.

The monomer used in the present invention includes at least one selected from the group consisting of a (meth)acrylate ester, a vinyl ester, a styrene compound, vinyl chloride and vinylidene chloride, and dissolves the above Rf compound.

Examples of the monomer include:

(1) methyl, ethyl, butyl, isobutyl, t-butyl, propyl, 2-ethylhexyl, hexyl, decyl, lauryl, stearyl, isobornyl, β-hydroxyethyl, glycidyl ester, phenyl, benzyl and 4-cyanophenyl esters of acrylic acid and methacrylic acid;

(2) vinyl esters of an aliphatic acid such as acetic acid, propionic acid, caprylic acid, lauric acid and stearic acid;

(3) a styrene compound such as styrene, α-methylstyrene and p-methylstyrene;

(4) vinyl chloride; and (5) vinylidene chloride. The monomer may be substituted with fluorine. For example, the monomer may be a monomer having a polyfluoroalkyl group, such as a (meth)acrylate ester having a polyfluoroalkyl group. Two or more monomers may be used in combination, so far as they dissolve each other.

In the composite emulsion used in the present invention, the concentration of fluorine in composite particles formed by the Rf compound and the monomer is usually at least 5% by weight, preferably from 10 to 70% by weight. When the concentration of fluorine is smaller than 5% by weight, good water- and oil-repellency and stainproof properties are not obtained. The proportion of the total amount of the Rf compound and monomer to the amount of the composite emulsion is usually not larger than 50% by weight, preferably from 10 to 45% by weight. When the proportion is larger than 50% by weight, particles are liable to fuse each other, which results in deterioration of stability. The weight ratio of the RF compound to the monomer is usually from 10:90 to 90:10, preferably from 20:80 to 80:20.

In order to obtain a composite emulsion having excellent stability, it is preferred to emulsify a mixture of the Rf compound and monomer in water by using an emulsifying device capable of imparting a strong shear energy, such as a high-pressure homogenizer and an ultrasonic homogenizer. As an emulsifier, various (e.g. anionic, cationic or nonionic) emulsifiers can be used. The amount of the emulsifier may be within the range from 0.5 to 10 parts by weight, based on 100 parts by weight of the total amount of the Rf compound and monomer. A water-soluble organic solvent may be added to improve emulsifiability. Examples of the water-soluble organic solvent include acetone, methyl ethyl ketone, ethyl acetate, propylene glycol, dipropylene glycol, tripropylene glycol, ethanol and the like. The water-soluble organic solvent is usually used in the amount of not more than 30 parts by weight, preferably from 5 to 20 parts by weight, based on 100 parts by weight of the total amount of the Rf compound and monomer.

In polymerization, there can be used a method of emulsifying a mixture of the Rf compound and monomer in water, introducing a polymerization initiator after substituting with nitrogen, and polymerizing the emulsion with stirring at the temperature within the range from 50 to 80° C. for several hours. As the polymerization initiator, there can be used a water-soluble polymerization initiator such as benzoyl peroxide, lauroyl peroxide, tertiary butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate; and an oil-soluble polymerization initiator such as azobisisobutyronitrile, benzoyl peroxide, di-tert-butyl peroxide, lauryl peroxide, cumene hydroperoxide, t-butyl peroxypivalate and diisopropyl peroxycarbonate. In the case of the use of the water-soluble polymerization initiator, if the amount of the emulsifier is not adjusted to give the concentration of the emulsifier in a continuous phase which is smaller than a critical micelle concentration, the monomer is emulsion-polymerized in a micelle and new particles of the polymer emulsion are formed, which results in reduction of formation ratio of the composite emulsion. The polymerization initiator may be used in the amount within the range from 0.01 to 5 parts by weight, based on 100 parts by weight of the monomer. In the polymerization, a chain transfer agent and a pH adjustor may be optionally used. The molecular weight of the composite emulsion obtained after the polymerization is usually from 10,000 to 1,000,000, preferably from 20,000 to 300,000.

The stainproofing composition of the present invention is applied by a method of coating on the surface of a substrate to be treated according to a known process such as dip coating, followed by drying or a method of spraying a treating liquid by a spray. If necessary, the stainproofing composition may be applied together with a suitable crosslinking agent, followed by curing. It is also possible to add other water repellents and oil repellents, or antifungus agents, flame retardants, antistatic agents, paint fixing agents, crease-proofing agents, etc. to the stainproofing composition of the present invention.

The substrate to be treated with the stainproofing composition of the present invention may be any textile, and is not specifically limited. Examples of the textile include animal- or vegetable-origin natural fibers such as cotton, hemp, wool, silk, etc.; synthetic fibers such as polyamide, polyester, polyvinyl alcohol, polyacrylonitrile, polyvinyl chloride, polypropylene, etc.; semisynthetic fibers such as rayon, acetate, etc.; and a mixture of these fibers. The textile may be in any form such as a fiber, a yarn, a fabric and the like. When the textile is a carpet, the carpet may be formed from fibers or yams treated with the composition of the present invention. Alternatively, the carpet may be treated with the composition of the present invention.

PREFERRED EMBODIMENT OF THE INVENTION

The present invention will be illustrated by the following Examples which do not limit the present invention.

The water repellency and oil repellency in case of treating a usual fiber are evaluated as follows. The water repellency is expressed by the water repellency No. (cf. the following Table 1) determined by the spray method according to JIS (Japanese Industrial Standard) L-1092. The oil repellency is determined by dropping several drops (diameter: about 4 mm) of a test solution shown in AATCC-TM-118-1966 (cf. the following Table 2) on two positions of the surface of a test cloth and observing the penetration state of the drops after 30 seconds. A maximum point of the oil repellency given by the test solution causing no penetration is recorded as the oil repellency. The superscripts "+" and "−" to the water repellency No. or oil repellency No. represent that the result is slightly better and slightly worse than said water repellency No. or oil repellency No., respectively.

TABLE 1

| Water repellency No. | State |
|---|---|
| 100 | No wet on the surface |
| 90 | Slight wet on the surface |
| 80 | Partial wet on the surface |
| 70 | Wet on the surface |
| 50 | Wet over the whole surface |
| 0 | Complete wet on the front and back surfaces |

TABLE 2

| Oil repellency | Test solution | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Hexadecane/Nujol (35/65 by weight) | 29.6 |
| 1 | Nujol | 31.2 |
| 0 | Inferior to 1 | 31.2 |

The water repellency and the stainproof properties in case of treating a carpet were evaluated as follows. The water repellency is determined by gently dropping small drops of an isopropyl alcohol/water mixture solution having the following composition shown in Table 3 on the surface of a carpet fabric and measuring a maximum content of isopropyl alcohol in the solution which maintains a shape of the drop after 3 minutes. The stainproof properties are determined as follows. First, a carpet is contaminated with a dry soil having the composition shown in Table 4 according to JIS 1023-1992. After the excess dry soil on the surface is sucked with an electrical cleaner, brightness of the surface is measured by a colorimeter and a staining degree is calculated from the following equation, which is taken for evaluation of dry soil stainproof properties.

Staining degree (%)=[($L_0$-L)/$L_0$]×100

($L_0$: brightness before contamination, L: brightness after contamination).

TABLE 3

| Mixture composition (volume ratio %) | |
|---|---|
| Isopropyl alcohol | Water |
| 50 | 50 |
| 40 | 60 |
| 30 | 70 |
| 20 | 80 |
| 10 | 90 |
| 0 | 100 |

TABLE 4

| Component | | Weight ratio (%) |
|---|---|---|
| Peat moss | | 40 |
| Portland cement | (JIS R 5210) | 17 |
| White clay | (JIS K 8746) | 17 |
| Diatomaceous earth | (JIS K 8330) | 17 |
| Carbon black | (JIS K 5107) | 0.1 |
| Iron (III) oxide for ferrite | (JIS K 1462) | 0.15 |
| Nujol | | 8.75 |

The oil repellencey in case of treating a carpet was evaluated according to the same manner as in case of treating a usual fiber.

PREPARATIVE EXAMPLE 1
(Composite emulsion of FA/StA copolymer)

In a four-necked flask equipped with a reflux condenser, a nitrogen introducing tube, a thermometer and a stirrer, 120 g of $CH_2$=CHCOO($CH_2$)$_2$($CF_2CF_2$)$_n$$CF_2CF_3$ (hereinafter referred to as "FA", a mixture of compounds wherein n is 3, 4 and 5 in a weight ratio of 5:3:1), 60 g of stearyl acrylate (StA), 700 g of 1,1,1-trichloroethane were charged and heated to 60° C. Then, the mixture was stirred under a nitrogen gas flow for 30 minutes. 1 g of t-butyl peroxypivalate (PERBUTYL PV manufactured by Nippon Oil & Fats Co. Ltd.) was added and the polymerization was conducted for 6 hours. A gas chromatography analysis revealed that at least 99% of monomers were polymerized. Ethanol was added to the resultant reaction solution to precipitate a polymer. The polymer was dried under vacuum to give a FA/StA copolymer (content of fluorine: 43% by weight). A molecular weight of the resultant FA/StA copolymer was measured by GPC. The weight average molecular weight was 50,000 (in polystyrene terms).

After 20 g of the FA/StA copolymer obtained by the above operation was dissolved in 40 g of ethyl acrylate (EA), the resultant solution was mixed with 150 g of deionized water, 24 g of acetone, 0.04 g of n-laurylmercaptan, 1.8 g of stearyltrimethylammonium chloride and 4.2 g of polyoxyethyleneoctylphenyl ether. The mixture was heated to 70° C. and emulsified by a high-pressure homogenizer to give an emulsion, which was charged in a four-necked flask equipped with a reflux condenser, a nitrogen introducing tube, a thermometer and a stirrer. After the emulsion was maintained at 70° C. under a nitrogen gas flow for about one hour with sufficient stir, 0.2 g of azobisisobutyronitrile (AIBN) was added to initiate the polymerization. A composite emulsion (content of fluorine: 14% by weight) was obtained after heating with stirring at 70° C. for 6 hours. A gas chromatography analysis revealed that at least 99% of monomers were polymerized. A molecular weight of the resultant composite emulsion was measured by GPC. Two peaks having weight average molecular weight (in terms of polystyrene) of 50,000 and 200,000 were observed. It was assumed that the former is a peak of the FA/StA copolymer and the latter is that of the EA polymer.

PREPARATIVE EXAMPLES 2 to 5
(Composite emulsion of FA/StA copolymer)

In Preparative Example 2, the same manner as in Preparative Example 1 was repeated, except that 30 g of EA and 10 g of FA were used as the monomer in which the FA/StA copolymer dissolves.

In the same manner, 20 g of EA and 20 g of FA were used in Preparative Example 3. 10 g of EA and 30 g of FA were used in Preparative Example 4. 40 g of FA was used in Preparative Example 5.

Comparative Preparative Example 1
(Blend emulsion of FA/StA copolymer)

10 g of the FA/StA copolymer used in Preparative Example 1, 5 g of ethyl acetate, 5 g of chlorofluorocarbon-113, 0.3 g of stearyltrimethylammonium chloride, 0.7 g of polyoxyethyleneoctylphenyl ether and 26 g of deionized water were mixed, heated to 60° C. and then emulsified by a high-pressure homogenizer. Ethyl acetate and chlorofluorocarbon were distilled off from the resultant emulsion by a rotary evaporator to give a FA/StA copolymer emulsion.

On the other hand, 60 g of EA, 150 g of deionized water, 24 g of acetone, 0.06 g of n-laurylmercaptane, 1.8 g of stearyltrimethylammonium chloride and 4.2 g of polyoxyethyleneoctylphenyl ether were mixed, heated to 70° C. and then emulsified by a high-pressure homogenizer to give an emulsion. The emulsion was charged in a four-necked flask equipped with a reflux condenser, a nitrogen introducing tube, a thermometer and a stirrer. After the emulsion was maintained at 70° C. under a nitrogen gas flow for about one hour with sufficient stir, 0.3 g of azobisisobutyronitrile (AIBN) was added to initiate the polymerization. A blender emulsion was obtained after heating with stirring at 70° C. for 6 hours. A gas chromatography analysis revealed that at least 99% of monomers were polymerized. A molecular weight of the resultant blender emulsion was measured by GPC. A weight average molecular weight was 200,000 (in terms of polystyrene).

The FA/StA copolymer emulsion and blender emulsion were blended so that a weight ratio of the solid content of the FA/StA copolymer emulsion to that of the blender emulsion was 1:2 to give a blend emulsion whose polymer composition is almost the same as that of the composite emulsion of Preparative Example 1.

Comparative Preparative Examples 2 to 5
(Blend emulsion of FA/StA copolymer)

In Comparative Preparative Example 2, the same manner as in Preparative Example 1 was repeated, except that 45 g of EA and 15 g of FA were used as the monomer of blender emulsion with which the FA/StA copolymer emulsion was blended.

In the same manner, 30 g of EA and 30 g of FA were used in Comparative Preparative Example 3. 15 g of EA and 45 g of FA were used in Comparative Preparative Example 4. 60 g of FA was used in Comparative Preparative Example 5.

Comparative Preparative Example 6
(FA/StA/EA copolymer emulsion)

6.7 g of StA, 40 g of EA, 13.3 g of FA, 150 g of deionized water, 24 g of acetone, 0.06 g of n-laurylmercaptan, 1.8 g of stearyltrimethylammonium chloride and 4.2 g of polyoxyethyleneoctylphenyl ether were mixed, heated to 70° C. and then emulsified by a high-pressure homogenizer. The resultant emulsion was charged in a four-necked flask equipped with a reflux condenser, a nitrogen introducing tube, a thermometer and a stirrer. After the emulsion was maintained at 70° C. under a nitrogen gas flow for about one hour with sufficient stir, 0.3 g of azobisisobutyronitrile (AIBN) was added to initiate the polymerization. A copolymer emulsion was obtained after heating with stirring at 70° C. for 6 hours. A gas chromatography analysis revealed that at least 99% of monomers were polymerized. A molecular weight of the resultant copolymer emulsion was measured by GPC. A weight average molecular weight was 180,000 (in terms of polystyrene).

The polymer composition of this emulsion is the same as that of the composite emulsion of Preparative Example 1.

Comparative Preparative Examples 7 to 10
(FA/StA/EA copolymer emulsion)

In Comparative Preparative Example 7, the same manner as in Comparative Preparative Example 6 was repeated, except that 6.7 g of StA, 30 g of EA and 23.3 g of FA were used as the monomer.

In the same manner, 6.7 g of StA, 20 g of EA and 33.3 g of FA were used in Comparative Preparative Example 8. 6.7 g of StA, 10 g of EA and 43.3 g of FA were used in Comparative Preparative Example 9. 6.7 g of StA and 53.3 g of FA were used in Comparative Preparative Example 10.

Comparative Preparative Example 11
(Polymer emulsion prepared by seed emulsion polymerization)

20 g of the FA/StA copolymer used in Preparative Example 1, 10 g of ethyl acetate, 10 g of chlorofluorocarbon-113, 0.6 g of stearyltrimethylammonium chloride, 1.4 g of polyoxyethyleneoctylphenyl ether and 52 g of deionized water were mixed, heated to 60° C. and then emulsified by a high-pressure homogenizer. Ethyl acetate and chlorofluorocarbon were distilled off from the resultant emulsion by a rotary evaporator to give a FA/StA copolymer emulsion The FA/StA copolymer emulsion was mixed with 40 g of EA, heated to 70° C. and then stirred for 24 hours. After stirring for about one hour under a nitrogen gas flow, 0.2 g of azobisisobutyronitrile (AIBN) was added to initiate the polymerization. A polymer emulsion whose polymer composition is the same as that of the composite emulsion of Preparative Example 1 was obtained after heating with stirring at 70° C. for 6 hours. A gas chromatography analysis revealed that at least 99% of monomers were polymerized. A molecular weight of the resultant polymer emulsion was measured by GPC. A weight average molecular weight was 170,000 (in terms of polystyrene).

Comparative Preparative Examples 12 to 15
(Polymer emulsion prepared by seed emulsion polymerization)

In Comparative Preparative Example 12, the same manner as in Comparative Preparative Example 11 was repeated, except that 30 g of EA and 10 g of FA were used as the monomer which was added to the FA/StA copolymer emulsion.

In the same manner, 20 g of EA and 20 g of FA were used in Comparative Preparative Example 13. 10 g of EA and 30 g of FA were used in Comparative Preparative Example 14. 40 g of FA was used in Comparative Preparative Example 15.

The polymer composition (weight ratio) of the composite emulsions, blend emulsions and copolymer emulsions, and polymer emulsions obtained by the seed emulsion polymerization, which were obtained by the above methods, is shown in Table 5. These emulsions are the same in polymer composition, but different in structure of particles.

TABLE 5

Polymer composition (weight ratio) of composite emulsions wherein Rf compound is FA/StA copolymer (Preparative Examples 1 to 5), and blend emulsions (Comparative Preparative Examples 1 to 5), copolymer emulsions (Comparative Preparative Examples 6 to 10) and polymer emulsions obtained by seed polymerization (Comparative Preparative Examples 11 to 15) which have the same composition as that of the above composite emulsions

| | | Fluorine concentration (wt %) | | | | |
|---|---|---|---|---|---|---|
| | | 14 | 25 | 36 | 46 | 57 |
| | | Preparative Example | | | | |
| | | 1 | 2 | 3 | 4 | 5 |
| Rf compound | FA/StA copolymer | 20 | 20 | 20 | 20 | 20 |
| Monomer | EA | 40 | 30 | 20 | 10 | 0 |
| Monomer | FA | 0 | 10 | 20 | 30 | 40 |
| | | Comparative Preparative Example | | | | |
| | | 1 | 2 | 3 | 4 | 5 |
| Rf compound emulsion | FA/StA copolymer emulsion | 20 | 20 | 20 | 20 | 20 |
| Polymer composition of blender emulsion (EA/FA copolymer emulsion) | EA | 40 | 30 | 20 | 10 | 0 |
| | FA | 0 | 10 | 20 | 30 | 40 |
| | | Comparative Preparative Example | | | | |
| | | 6 | 7 | 8 | 9 | 10 |
| Monomer | StA | 6.7 | 6.7 | 6.7 | 6.7 | 6.7 |
| Monomer | EA | 40 | 30 | 20 | 10 | 0 |
| Monomer | FA | 13.3 | 23.3 | 33.3 | 43.3 | 53.3 |
| | | Comparative Preparative Example | | | | |
| | | 11 | 12 | 13 | 14 | 15 |
| Rf compound emulsion | FA/StA copolymer emulsion | 20 | 20 | 20 | 20 | 20 |
| Monomer | EA | 40 | 30 | 20 | 10 | 0 |
| Monomer | FA | 0 | 10 | 20 | 30 | 40 |

EXAMPLE 1
(Composite emulsion of FA/StA copolymer)

A polyester (tropical) fabric was immersed in a diluted liquid (solid content: 1% by weight) of the composite emulsion prepared in Preparative Examples 1–5. Then, the polyester fabric was dried at 80° C. for 3 minutes and cured at 150° C. for 3 minutes. Alternatively, the polyester fabric was dried at 80° C. for 3 minutes and cured at a low temperature of 100° C. for 3 minutes. Initial water- and oil-repellency of the treated fabric was evaluated. The results are shown in Table 6.

Comparative Example 1
(Blend emulsion of FA/StA copolymer)

The water- and oil-repellency of the blend emulsions prepared in Comparative Preparative Examples 1 to 5 was evaluated in the same manner as in Example 1. The results are shown in Table 6.

Comparative Example 2
(FA/StA/EA copolymer emulsion)

The water- and oil-repellency of the copolymer emulsions prepared in Comparative Preparative Examples 6 to 10 was evaluated in the same manner as in Example 1. The results are shown in Table 6.

Comparative Example 3
(Polymer emulsion prepared by seed emulsion polymerization)

The water- and oil-repellency of the polymer emulsions prepared in Comparative Preparative Examples 11 to 15 was evaluated in the same manner as in Example 1. The results are shown in Table 6.

TABLE 6

Water repellency oil-repellency of composite emulsions wherein Rf compound is FA/StA copolymer, and blend emulsions, copolymer emulsions and polymer emulsions obtained by seed polymerization, which have the same composition as that of the above composite emulsions (temperature in the table is a curing temperature)

| | | Fluorine concentration (wt %) | | | | |
|---|---|---|---|---|---|---|
| | | 14 | 25 | 36 | 46 | 57 |
| | | Preparative Example | | | | |
| Example 1 | | 1 | 2 | 3 | 4 | 5 |
| Composite emulsion | 150° C. | 70+/4 | 80+/5 | 90/7 | 100/7 | 100+/7 |
| | 100° C. | 70/2 | 80/6 | 80+/6 | 90+/8 | 100/7 |
| Comparative Example 1 | | Comparative Preparative Example | | | | |
| Blend emulsion | | 1 | 2 | 3 | 4 | 5 |
| | 150° C. | 50/1 | 50+/2 | 70/4 | 70/5 | 80/5 |
| | 100° C. | 0/0 | 50/2 | 70/3 | 70/4 | 80/5 |
| Comparative Example 2 | | Comparative Preparative Example | | | | |
| Copolymer emulsion | | 6 | 7 | 8 | 9 | 10 |
| | 150° C. | 0/0 | 50/3 | 50/3 | 50/4 | 80/5 |
| | 100° C. | 0/0 | 0/1 | 50/1 | 50/2 | 70+/4 |
| Comparative Example 3 | | Comparative Preparative Example | | | | |
| Polymer emulsion | | 11 | 12 | 13 | 14 | 15 |
| prepared by seed emulsion polymerization | 150° C. | 70/3 | 70+/4 | 80/5 | 90/6 | 90+/6 |
| | 100° C. | 50+/1 | 70/2 | 70/5 | 80/5 | 80/5 |

In order to determine the reason why the composite emulsion is superior in water- and oil-repellency to the blend emulsion, copolymer emulsion and polymer emulsion prepared by the seed emulsion polymerization as shown in Example 1 and Comparative Examples 1 to 3, a surface fluorine analysis of the treated fabric cured at 150° C. was conducted by ESCA. A relationship between F/C (as a measure of the surface fluorine concentration) and the fluorine concentration in the polymer is shown in FIG. 1.

As is apparent from this result, the surface fluorine concentration of the fabric treated with the composite emulsion is higher than that treated with the blend emulsion, copolymer emulsion and polymer emulsion prepared by the seed emulsion polymerization. This result shows that the surface fluorine concentration of a polymer film is high and it is easy to uniformly form the polymer film on the fiber. The reason why the composite emulsion has such characteristics is supposed that the composite emulsion has the structure that a polymer having a high fluorine content is dispersed at the micro-state in one particle while a polymer having good film formation properties serves as a continuous phase. It is an object to prepare the emulsion having the same structure also in the seed emulsion polymerization. However, in the seed emulsion polymerization, all of the monomer added later are not adsorbed on seed emulsion particles, and a part of the monomer is dispersed in a free state. In an extreme case, the monomer added later are not adsorbed on seed emulsion particles at all, and the same blend emulsion as that prepared in Comparative Preparative Examples 1 to 5 is prepared. The above is assumed to be the reason why the polymer emulsion prepared by the seed emulsion polymerization is inferior in performance to the composite emulsion.

PREPARATIVE EXAMPLE 6
(Composite emulsion of Rf polyester)

In a four-necked flask equipped with a reflux condenser, a nitrogen introducing tube, a thermometer and a stirrer, 66 g of perfluoroalkyl 2,3-epoxypropane [a perfluoroalkyl group $CF_3CF_2(CF_2CF_2)_n$ — is a mixture wherein n is 2, 3, 4, 5 and 6 in a weight ratio of 2:50:30:15:3], 30 g of phthalic anhydride and 15 g of phenyl glycidyl ether were charged and heated to 130° C. with flowing a nitrogen gas. 0.1 g of N,N-dimethylbenzylamine was added and, after confirming that a gas chromatography that the consumption rate of perfluoroalkyl 2,3-epoxypropane reached 99% (usually, about 8 hours), 0.8 g of acetic anhydride was added. The reaction mixture was continuously stirred for 2 hours and then cooled to give a Rf polyester having a melting point of about 70° C.

120 g of the Rf polyester was sufficiently dissolved in 280 g of methyl methacrylate (MMA), and then 19 g of sodium α-olefin sulfonate, 21 g of polyoxyethylene sorbitan monooleate, 0.1 g of lauryl mercaptan and 684 g of deionized water were added. The mixture was emulsified by a high-pressure homogenizer. The resultant emulsion was charged in a four-necked flask equipped with a reflux condenser, a nitrogen introducing tube, a thermometer and a stirrer. After the emulsion was maintained at 70° C. under a nitrogen gas flow for about one hour with sufficient stir, 2 g of AIBN was added to initiate the polymerization. A composite emulsion was obtained after heating with stirring at 70° C. for 6 hours. A gas chromatography analysis revealed that at least 99% of monomers were polymerized. A molecular weight of the resultant composite emulsion was measured by GPC. A weight average molecular weight was 250,000 (in terms of polystyrene).

Comparative Preparative Example 16
(Blend emulsion of Rf polyester)

10 g of the Rf polyester used in Preparative Example 6, 5 g of ethyl acetate, 5 g of chlorofluorocarbon-113, 0.475 g of sodium α-olefinsulfonate, 0.525 g of polyoxyethylene-sorbitan monooleate and 26 g of deionized water were mixed, heated to 60° C. and then emulsified by a high-pressure homogenizer. Ethyl acetate and chlorofluorocarbon were distilled off from the resultant emulsion by a rotary evaporator to give a Rf polyester emulsion.

On the other hand, 60 g of MMA, 174 g of deionized water, 0.06 g of n-laurylmercaptan, 2.85 g of sodium a-olefinsulfonate and 3.15 g of polyoxyethylene sorbitan monooleate were mixed, heated to 70° and then emulsified by a high-pressure homogenizer to give an emulsion. The emulsion was charged in a four-necked flask equipped with a reflux condenser, a nitrogen introducing tube, a thermometer and a stirrer. After the emulsion was maintained at 70° C. under a nitrogen gas flow for about one hour with sufficient stir, 0.3 g of AIBN was added to initiate the polymerization. A blender emulsion was obtained after heating with stirring at 70° C. for 6 hours. A gas chromatography analysis revealed that at least 99% of monomers were polymerized. A molecular weight of the resultant blender emulsion was measured by GPC. A weight average molecular weight was 250,000 (in terms of polystyrene).

The Rf polyester emulsion and the blender emulsion were mixed so that a weight ratio of the solid content of the Rf polyester emulsion to that of the blender emulsion was 3:7 to give a blend emulsion whose polymer composition is the same as that of the composite emulsion of Preparative Example 6.

PREPARATIVE EXAMPLE 7
(Composite emulsion of Rf maleate)

In a flask equipped with a Dean-Stark trap, 300 g (0.581 mol) of perfluoroalkyl ethanol [$CF_3CF_2(CF_2CF_2)_nCH_2CH_2OH$, a mixture wherein n is 2, 3; 4 5 and 6 in a weight ratio of 2:50:30:15:3, average molecular weight: 516], 132 g 1.138 mol) of maleic acid and 80 g of benzene were charged and heated to 55° C. with stirring. 0.1 g of p-toluenesulfonic acid and 0.4 g of sulfuric acid were added, followed by heating to 83° C. Benzene was refluxed and the reaction was continued with removing water for 11 hours. Then, 28 g of a 10% aqueous sodium carbonate solution was added and, after stirring continuously for 2 hours, benzene and water were distilled off at 88° C. under 20 mmHg. After heating to about 90° C., insoluble materials were removed by filtering with a SUS mesh to give 400 g (yield: 93%) of a perfluoroalkyl group-containing maleate (Rf maleate).

Except that the Rf maleate was used instead of the Rf polyester, the same manner as in Preparative Example 6 was repeated to prepare a Rf maleate composite emulsion.

Comparative Preparative Example 17
(Blend emulsion of Rf maleate)

Except that the Rf maleate was used, the same manner as in Comparative Preparative Example 1 was repeated to prepare a blend emulsion of a Rf maleate.

PREPARATIVE EXAMPLE 8
(Composite emulsion of Rf fumarate)

Except that 132 g of fumaric acid was used instead of maleic acid, the same manner as in Preparative Example 7 was repeated to prepare a perfluoroalkyl group-containing fumarate (Rf fumarate). Furthermore, the same manner as in Preparative Example 7 was repeated to prepare a Rf fumarate composite emulsion.

Comparative Preparative Example 18
(Blend emulsion of Rf fumarate)

Except that the Rf fumarate was used, the same manner as in Comparative Preparative Example 1 was repeated to prepare a blend emulsion of a Rf fumarate.

EXAMPLE 2
(Rf polyester composite emulsion)

The Rf polyester composite emulsion of Preparative Example 6 was diluted with water to prepare a liquid having a solid content of 3% by weight, which was used as a treating liquid. This treating liquid was spray-coated on a nylon loop-piled carpet fabric (non-backed product) so that the loading amount was 100 g/m², followed by drying with heating at 130° C. for 3 minutes. The water- and oil-repellency and stainproof properties of the treated carpet were evaluated. The results are shown in Table 7.

Comparative Example 4
(Rf polyester blend emulsion)

Except that the Rf polyester blend emulsion obtained in Comparative Preparative Example 16 was used, the same manner as in Example 2 was repeated to evaluate the water- and oil-repellency and stainproof properties. The results are shown in Table 7.

EXAMPLE 3
(Rf maleate composite emulsion)

Except that the Rf maleate composite emulsion obtained in Preparative Example 7 was used, the same manner as in Example 2 was repeated to evaluate the water- and oil-repellency and stainproof properties. The results are shown in Table 7.

Comparative Example 5
(Rf maleate blend emulsion)

Except that the Rf maleate blend emulsion obtained in Comparative Preparative Example 17 was used, the same manner as in Example 2 was repeated to evaluate the water- and oil-repellency and stainproof properties. The results are shown in Table 7.

EXAMPLE 4
(Rf fumarate composite emulsion)

Except that the Rf fumarate composite emulsion obtained in Preparative Example 8 was used, the same manner as in Example 2 was repeated to evaluate the water- and oil-repellency and stainproof properties. The results are shown in Table 7.

Comparative Example 6
(Rf fumarate blend emulsion)

Except that the Rf fumarate blend emulsion obtained in Comparative Preparative Example 18 was used, the same manner as in Example 2 was repeated to evaluate water- and oil-repellency and stainproof properties. The results are shown in Table 7.

TABLE 7

Water repellency, oil repellency and stainproof properties of composite emulsions wherein Rf compound is Rf polyester, Rf maleate and Rf fumarate, and blend emulsions having the same composition as that of the above composite emulsions

| | Type of emulsion | Water repellency | Oil repellency | Stainproof properties |
|---|---|---|---|---|
| Example 2 | Rf polyester composite emulsion | 30 | 4 | 19 |
| Comparative Example 4 | Rf polyester blend emulsion | 20 | 3 | 30 |
| Example 3 | Rf maleate composite emulsion | 40 | 5 | 21 |
| Comparative Example 5 | Rf maleate blend emulsion | 30 | 4 | 35 |
| Example 4 | Rf fumarate composite emulsion | 40 | 5 | 20 |
| Comparative Example 6 | Rf fumarate blend emulsion | 30 | 4 | 28 |

We claim:
1. A stainproofing composition having water- and oil-repellency, comprising a polymer emulsion prepared by dissolving at least one polyfluoroalkyl group-containing compound selected from the group consisting of a polyfluoroalkyl group-containing acrylate polymer, a polyfluoroalkyl group-containing methacrylate polymer, a polyfluoroalkyl group-containing polyester, a polyfluoroalkyl group-containing maleate and a polyfluoroalkyl group-containing fumarate in at least one monomer selected from the group consisting of an acrylate ester, a methacrylate ester, a vinyl ester, a styrene compound, vinyl chloride and vinylidene chloride;

emulsifying the resultant solution in water to produce an oil-in-water emulsion; and polymerizing the oil-in-water emulsion to produce a polymer emulsion, wherein the polymer emulsion has a microphase separation particle structure.

2. The stainproofing composition according to claim 1, wherein the polyfluoroalkyl group-containing compound is a polymer of a polyfluoroalkyl group-containing acrylate or methacrylate having a repeating unit represented by formula (1):

$$-(CH_2C)- \atop {\overset{X}{|}} \atop {\underset{COO-A-Rf}{|}} \quad (1)$$

a polyfluoroalkyl group-containing polyester represented by formula (2):

$$-(CHCH_2O)_x-(OC-B^1-COO)_y-(CHCH_2O)_z- \quad (2)$$

with side chains A–Rf and CH$_2$–O–phenyl, a polyfluoroalkyl group-containing maleate represented by formula (3):

$$\begin{array}{c} H \diagdown \phantom{x} \diagup COO-A-Rf \\ C \\ \| \\ C \\ \diagup \phantom{x} \diagdown \\ H \phantom{xxx} COO-A-Rf \end{array} \quad (3)$$

or a polyfluoroalkyl group-containing fumarate represented by formula (4):

$$\begin{array}{c} H \diagdown \phantom{x} \diagup COO-A-Rf \\ C \\ \| \\ C \\ \diagup \phantom{x} \diagdown \\ Rf-A-OCO \phantom{xx} H \end{array} \quad (4)$$

wherein Rf is a polyfluoroalkyl group having 6 to 16 carbon atoms;

A is an alkylene group having 1 to 4 carbon atoms, $$-R^2-N-S-, \quad -R^2-N-CO- \atop {\overset{R^1}{|}} \phantom{xx} {\overset{R^1}{|}}$$

(with =O on S)

wherein R$^1$ is an alkyl group having 1 to 4 carbon atoms and R$^2$ is an alkylene group having 1 to 4 carbon atoms or $$-CH_2CHCH_2- \atop {\overset{OH}{|}} ;$$

B$^1$ is an alkylene group having 1 to 4 carbon atoms or a phenylene group;

X is a hydrogen atom or a methyl group x is from 1 to 1000; y is from 1 to 100; and z is from 1 to 1000.

3. The stainproofing composition according to claim 2, wherein, the polyfluoroalkyl group-containing compound is a polymer of a polyfluoroalkyl group-containing acrylate or methacrylate having a repeating unit represented by formula (1):

$$-(CH_2C)- \atop {\overset{X}{|}} \atop {\underset{COO-A-Rf}{|}} \quad (1)$$

wherein Rf is a polyfluoroalkyl group having 6 to 16 carbon atoms;

A is an alkylene group having 1 to 4 carbon atoms, $$-R^2-N-S-, \atop {\overset{R^1}{|}} \phantom{x} {\overset{O}{\|}}$$

$$-R^2-N-CO- \atop {\overset{R^1}{|}}$$

wherein R$^1$ is an alkyl group having 1 to 4 carbon atoms and R$^2$ is an alkylene group having 1 to 4 carbon atoms or $$-CH_2CHCH_2- \atop {\overset{OH}{|}} ;$$

and X is a hydrogen atom or a methyl group.

4. The stainproofing composition according to claim 2, wherein, the polyfluoroalkyl group-containing compound is a polymer of a polyfluoroalkyl group-containing polyester represented by formula (2):

$$-(CHCH_2O)_x-(OC-B^1-COO)_y-(CHCH_2O)_z- \quad (2)$$

wherein Rf is a polyfluoroalkyl group having 6 to 16 carbon atoms;

A is an alkylene group having 1 to 4 carbon atoms, $$-R^2-N-S-, \atop {\overset{R^1}{|}} \phantom{x} {\overset{O}{\|}}$$

$$-R^2-N-CO- \atop {\overset{R^1}{|}}$$

wherein R$^1$ is an alkyl group having 1 to 4 carbon atoms and R$^2$ is an alkylene group having 1 to 4 carbon atoms or $$-CH_2\underset{\underset{OH}{|}}{CH}CH_2-;$$

$B^1$ is an alkylene group having 1 to 4 carbon atoms or a phenylene group;

x is from 1 to 1000; y is from 1 to 100; and z is from 1 to 1000.

5. The stainproofing composition according to claim 2, wherein, the polyfluoroalkyl group-containing compound is a polymer of a polyfluoroalkyl group-containing maleate represented by formula (3):

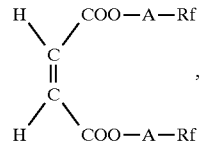 (3)

wherein Rf is a polyfluoroalkyl group having 6 to 16 carbon atoms;

A is an alkylene group having 1 to 4 carbon atoms,

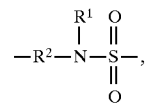

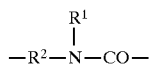

wherein $R^1$ is an alkyl group having 1 to 4 carbon atoms and $R^2$ is an alkylene group having 1 to 4 carbon atoms or $$-CH_2\underset{\underset{OH}{|}}{CH}CH_2-;$$

6. The stainproofing composition according to claim 2, wherein, the polyfluoroalkyl group-containing compound is a polyfluoroalkyl group-containing fumarate represented by formula (4):

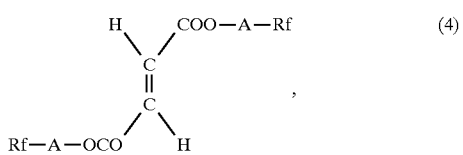 (4)

wherein Rf is a polyfluoroalkyl group having 6 to 16 carbon atoms;

A is an alkylene group having 1 to 4 carbon atoms,

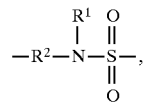

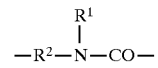

wherein $R^1$ is an alkyl group having 1 to 4 carbon atoms and $R^2$ is an alkylene group having 1 to 4 carbon atoms or

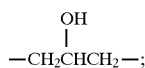

* * * * *